Patented May 16, 1939

2,158,954

UNITED STATES PATENT OFFICE 2,158,954

PURIFICATION OF SEWAGE OR WASTE LIQUORS

Paul Zigerli, Zurich, Switzerland

No Drawing. Application May 26, 1936, Serial No. 81,960. In Switzerland June 20, 1935

4 Claims. (Cl. 210—2)

The present invention relates to a new and improved method of purification of sewage or waste liquors and to filters adapted to be used for carrying out said method.

According to the present invention the purification of town sewage or other waste liquors is effected by means of asbestos. For example, separated or combed asbestos fibres, which are added to the sewage and float therein, may be employed. The asbestos fibres when immersed in the sewage form a very loose floating filter, the asbestos fibres may be used either alone or in conjunction with a carrier-material. The asbestos fibres being slightly heavier than water will not float directly on the surface of the sewage but below surface. The liquor passes freely through the said loose filter. The asbestos may be caused to act on the sewage either alone or simultaneously with an oxidising agent, such for instance as air or ozonised air.

It is known that separated asbestos fibres have not the drawbacks of organic fibrous materials as regards swelling up and retaining water, as they are of mineral composition; their power of filtration therefore remains unaltered as compared with organic fibres.

Numerous experiments carried out by the inventor have shown that asbestos, especially separated or combed asbestos fibres, not only retains the floating or suspended substances, but also clarifies solutions, such as are present, for example, in waste liquors from dyeworks, dairies, tanneries, sugar refineries and other industrial works. Thus not only a physical, but also a chemical purification and clarifying of the waste liquor take place. Microorganism adapted to clarify the respective waste liquid settles on the asbestos fibres and there undergoes a biological function. The purified crude liquor is clear and odourless, and remains non-putrefactive entirely or for a long time according to its composition.

After the asbestos fibres are completely saturated, they are cleaned or purified in known manner, and are thereby again capable of use. The dirt and impurities washed out are employed as manures, either alone, or in combination with peat or peat dust.

The efficiency and duration of working of the asbestos filter is further increased, if the coarse materials contained in the sewage or waste liquor are retained by a filter arranged in advance of the main one, such for instance as a coarse peat-filter, sand filter, or a settling vessel. A succeeding filter of peat or the like retains any floating asbestos fibres.

To increase the duration of working and to fully utilise the absorptive capacity of the asbestos filter on the one hand, and to avoid the setting in of putrefaction on the other hand, the filter may be aerated in known manner, whereby a bacterial activation results in the filter, that is, a biological action similar to that in the activated sludge process is obtained in the smallest space. By leaving a part of this fibrous material containing the organism behind in the receptacle when refilling, the organism is developed and continued also in the fresh fibre and therefore remains preserved.

The method forming the object of the present invention has also the advantage, as compared with ordinary filters, that the efficiency as regards passage of liquid is considerably increased by a floating and not a compact filter being employed; for example 100 kg. of separated asbestos fibres in the form of wadding are mixed in the container with 3 m.$^3$ of water, the mixture during the passage of the waste liquor being kept in movement either mechanically or by a suitably strong supply of air without leaving the container. A simple contact of the crude liquor with the asbestos fibres suffices to obtain the desired purification. As the asbestos fibres float in the liquor but are somewhat heavier than it, there is no filtering layer floating on the surface of the liquor, and the whole filter forms a uniform body and an intimate contact of the waste liquor with the separate fibres is attained, whereby the putrefactive substances are retained and separated out by the filtering material.

The asbestos fibres may be used in form of wadding or they may be used in bunches or they may be attached uniformly to any suitable fabric to form a fleece or a pelt. The asbestos fibres may be used in form of hanks held by one end and held floating in the liquid.

The process as practically carried out for purifying sewage liquors in accordance with the present application is the following: The sewage water preferably having been clarified from those substances which can be deposited, flows through a basin in which the asbestos slurry is located. The asbestos mass is in loose condition. It is thoroughly commingled with the sewage water, and at the same time, it is artificially aerated. This intermixture may be practiced by introducing the air by itself or additional mechanical devices may be used for this purpose. The sewage water after having flowed through the basin in which the asbestos is suspended, flows into a funnel-shaped container in which asbestos carried eventually in this water will be deposited. It then leaves the entire plant over a bed of slag or eventually through a small sand filter which has the function of holding back small fibres of asbestos which might float with the water.

With this process of purification, it is possible to obtain an absolutely purified sewage water entirely unable to set up decay in a flow time of one-half to one hour.

Regeneration of asbestos has not been required up to now even after the plant has been in operation for eight months. This condition is due to the fact that there is continually a process of self-purification in action. This process is based on biological and bio-chemical principles. It is, therefore, only necessary to replace the asbestos in that proportion in which this is made necessary by the mechanical losses entailed thru very small particles which float in the water and are carried off.

Very careful tests have demonstrated that the aeration of the suspended filtering material not only has the effect of mechanically commingling water and asbestos, but it also leads directly to oxidizing conditions and generally to conditions which destroy the impurities and decrease them in numbers.

Approximately two-thirds or even three-fourths of those substances in the sewage water which consume potassium permanganate are continually oxidized. The organic nitrogen is reduced by 76 to 83 per cent. It is converted into nitrogen of amino-acids, ammonia and nitrite, and from these compounds it is converted into the nitrogen of nitrates and elementary nitrogen. In addition to this last named gas, there are also present carbon dioxide and methane.

The strong activity of reducing impurities is inherent particularly to that asbestos which is present in an aqueous slurry and which is aerated. Asbestos after having been fully charged with the impurities from sewage water had been aerated in tests made by the Swiss federal engineering college. Some of these tests were carried out by aerating the asbestos while it was in aqueous suspension. Some of them were carried out by aerating it on wire netting, exposing it in the air to the influence of the weather. One test was made daily, while periodically wetting the asbestos with water. The reduction or even the destruction of the impurities proceeded most strongly in that test in which the asbestos was suspended in water and had been aerated.

I declare that what I claim is:

1. Process of purifying sewer waters, characterized in this, that the water to be purified is caused to flow through asbestos in the form of a slurry maintained in motion and at the same time aerated, the asbestos absorbing the impurities and effecting by the active bacterial function a continuous self-cleaning condition biologically and bio-chemically, and effecting the destruction of those substances in the water which may decay.

2. Process of purifying sewer waters, comprising the following steps: first, clarifying the water by settling process; second, passing the clarified water into a basin in which asbestos slurry is located, the asbestos mass being in loose condition, and at the same time aerating the mass, until the asbestos absorbs the impurities and there is effected by the active bacterial function a continuous self-cleaning condition biologically and bio-chemically until in consequence thereof the destruction of those substances in the water which may decay is effected; third, passing the water from the basin through a filter or strainer to remove asbestos carried over by the water.

3. A continuous process of purifying waste waters physically, chemically and biologically, in which the waste water is commingled with flocculated asbestos and is then aerated.

4. A continuous process of purifying waste waters physically, chemically and biologically, in which the waste water is commingled with flocculated asbestos, is then aerated, and the sludge of asbestos after having been deposited is returned in circulation to the waste water to be purified.

PAUL ZIGERLI.